United States Patent [19]
Krulik

[11] Patent Number: 6,059,079
[45] Date of Patent: May 9, 2000

[54] ROLLING CATALOG CASE WITH EXTERNAL COMPARTMENT FOR LAPTOP COMPUTER

[75] Inventor: Richard J. Krulik, Dix Hills, N.Y.

[73] Assignee: United States Luggage, L.P., Hauppauge, N.Y.

[21] Appl. No.: 09/111,891

[22] Filed: Jul. 8, 1998

[51] Int. Cl.$^7$ .............................. A45C 5/12; A45C 13/10; A45C 5/14

[52] U.S. Cl. ......................... 190/112; 190/111; 190/125; 190/18 A; 206/320

[58] Field of Search .................................. 190/18 A, 109, 190/111, 112, 114; 383/41; 150/117; 206/320

[56] References Cited

U.S. PATENT DOCUMENTS

| | | | |
|---|---|---|---|
| D. 352,395 | 11/1994 | King | D3/279 |
| D. 354,396 | 1/1995 | Löwenstein | D3/276 |
| D. 354,397 | 1/1995 | Berman | D3/276 |
| D. 354,398 | 1/1995 | Berman | D3/276 |
| D. 364,504 | 11/1995 | Bieber et al. | D3/276 |
| D. 372,581 | 8/1996 | Bernstein et al. | D3/279 |
| D. 381,511 | 7/1997 | Krulik | D3/279 |
| D. 395,164 | 6/1998 | Langmuir et al. | D3/279 |
| 2,034,398 | 3/1936 | Kash | 150/117 |
| 2,154,630 | 4/1939 | Marbury et al. | 190/111 |
| 2,180,191 | 11/1939 | Bauch | 190/111 |
| 2,213,821 | 9/1940 | McCurdy | 190/111 |
| 3,164,231 | 1/1965 | Kryznoski | 190/43 |
| 4,840,258 | 6/1989 | Tomikawa et al. | 190/102 |
| 5,010,988 | 4/1991 | Brown | 190/127 X |
| 5,105,919 | 4/1992 | Bomes et al. | 190/111 X |
| 5,105,920 | 4/1992 | Grebenstein | 190/111 X |
| 5,108,119 | 4/1992 | Huang | 190/18 A X |
| 5,291,976 | 3/1994 | Ku | 190/18 A |
| 5,310,031 | 5/1994 | Plath | 190/18 A |
| 5,375,685 | 12/1994 | Plath | 190/18 A |
| 5,435,423 | 7/1995 | Rekuc et al. | 190/18 A |
| 5,474,162 | 12/1995 | Shyr et al. | 190/18 A |
| 5,494,157 | 2/1996 | Golenz et al. | 206/370 |
| 5,524,754 | 6/1996 | Hollingsworth | 206/320 |
| 5,676,223 | 10/1997 | Cunningham | 190/109 |
| 5,762,170 | 6/1998 | Shyr et al. | 206/320 X |
| 5,871,280 | 2/1999 | Watters | 383/41 |

FOREIGN PATENT DOCUMENTS

2480579  10/1981  France ..................................... 190/111

*Primary Examiner*—Sue A. Weaver
*Attorney, Agent, or Firm*—Abelman, Frayne & Schwab

[57] ABSTRACT

A wheeled article of luggage, which has a catalog case, is disclosed which includes an externally accessible auxiliary pocket configured for the reception of a laptop computer. The auxiliary pocket may also be accessed from the interior of the case, with the exterior, and interior access means being orthognally related, such that they will both be in a horizontal position when the catalog case is in either the wheeled, or stationary, open condition.

12 Claims, 2 Drawing Sheets

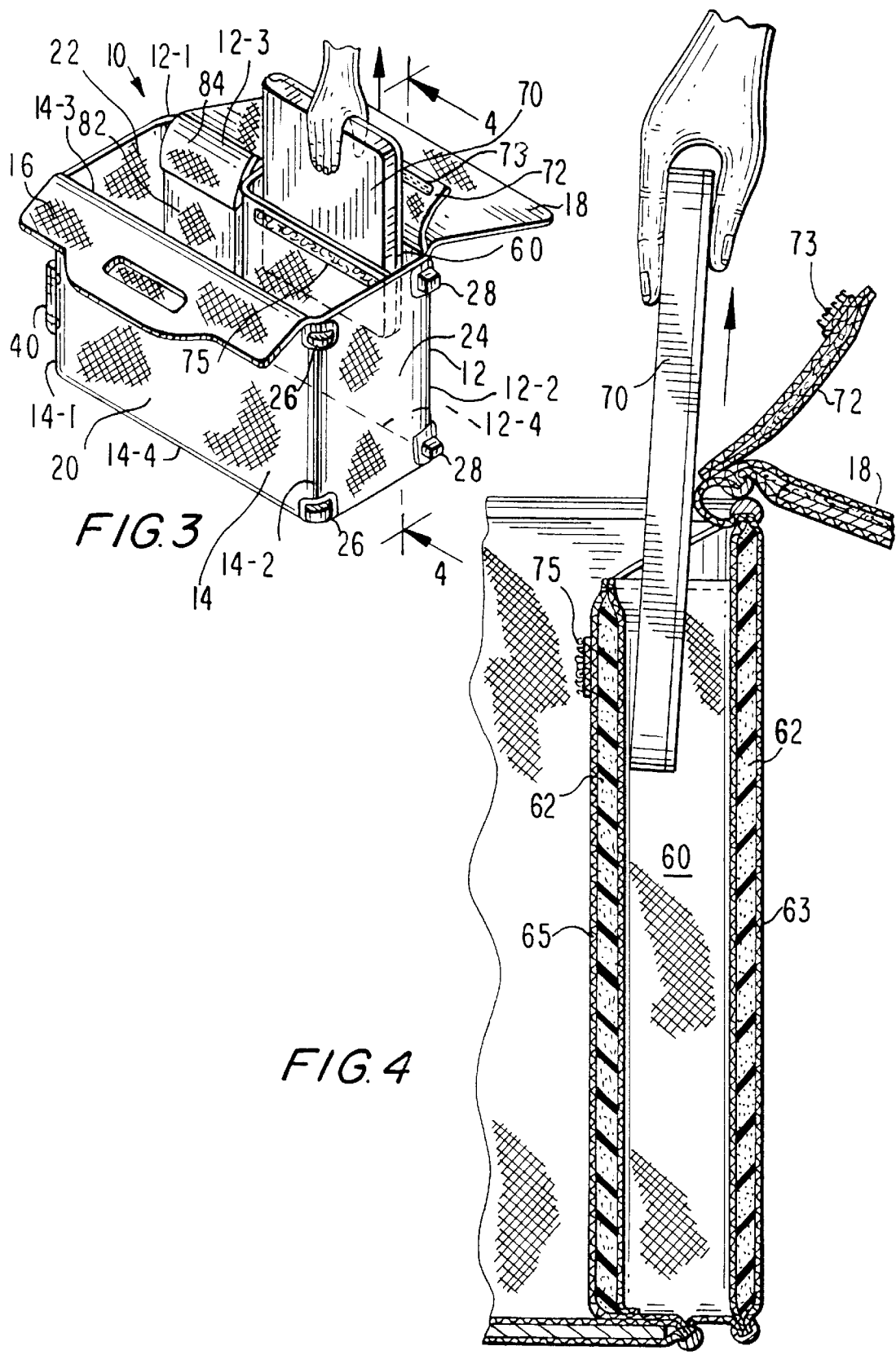

ROLLING CATALOG CASE WITH EXTERNAL COMPARTMENT FOR LAPTOP COMPUTER

The present invention relates to a rolling catalog case which includes a protective accessory pocket configured to receive a laptop computer. The accessory compartment may be either externally accessed, or interiorly accessed when the rolling catalog case is opened.

BACKGROUND OF THE INVENTION

Catalog cases are customarily used for the manual transport of bulky catalogs or files, and auxiliary implements (e.g., pocket calculators, pens, pencils, etc.) utilized by the user in conjunction with transporting the contents of the catalog case to different locations. Because of the substantial weight of the contents that may be included within the catalog case the applicant of the present invention has previously modified such cases to include wheels, and a retractable handle, as shown in U.S. Desing Pat. No. 381,511 which issued on Jul. 29, 1997. Thus, instead of manually carryng the catalog case, the user can transform the catalog case to a wheeled condition, pull out the retractable handle, and move the catalog case along the ground surface. When it is desired to obtain access to the interior article receiving enclosure of the catalog case, the handle is retracted, the catalog case rotated 90° so as to upwardly position its openable side. Exterior compartments may also be provided along one of the walls, typically the front wall, of the catalog case, in order to provide the user with ready access to certain articles being carried by the catalog case without necessitating the opening of the catalog case. With the recent advent of personal laptop computers, it is desirable to provide a pocket within the catalog case for safely and conveniently storing a laptop computer, while allowing easy, and safe, access to a laptop computer. Such access will preferably enable the laptop computer to be removed from its accessory pocket, from either the exterior or interior of the catalog case.

SUMMARY OF THE INVENTION

The present invention provides a wheeled article of luggage, such as a catalog case, which includes an accessory pocket particularly configured to receive a laptop computer. The accessory pocket has two independent closure means for selectively removing the laptop computer from the catalog case. A first of these closure means is at the exterior of the catalog case, so as to readily permit the removal of the laptop computer without having to access the interior volume of the catalog case. The second closure means is in the interior of the catalog case so as to provide access to, and removal of, the catalog case when the catalog case is opened. Recognizing that catalog cases are generally constructed with the opening along a side wall, with the wheels, to permit movement, being along the bottom wall, there will be an orthognal relationship between the orientation of the wheeled case when it is in its wheeled transport mode, and stationary open mode. Accordingly, the exterior and interior accesses to the accessory pocket, provided by their respective closure means, should be oriented so as to prevent inadvertent falling out of the laptop computer. More specifically, when the wheeled catalog case is in its transport mode, with its wheels and its bottom wall moving along the ground surface, it is most desirable that the exterior opening to the laptop accessory pocket be horizontally oriented, and accessible from the top region of the case. Should the exterior access to the accessory pocket be opened, the laptop computer will not inadvertently fall out of the accessory compartment. Similarly, when the catalog case is rotated 90°, the interior access to the accessory pocket will likewise be horizontally oriented along the then topmost portion of the catalog case so as to prevent the removal of the laptop computer unless the user manually grasps the laptop computer to upwardly remove same out of the accessory pocket.

Accordingly, an object of the present invention is to provide a wheeled article of luggage, such as a catalog case, which includes an exteriorly and interiorly accessible accessory pocket configured to receive a laptop computer.

Another object of the present invention is to provide such a wheeled article of luggage in which the interior and exterior access openings for the accessory pocket are independently and manually opened or closed.

A further object of the present invention is to provide such a wheeled article of luggage in which the manually closable exterior and interior access openings to the accessory pocket are orthognally related, such that they will both be in a generally horizontal orientation during the wheeled transport condition, or stationary open condition, of the wheeled article of luggage.

Yet another object of the present invention is to provide such a wheeled article of luggage in which the accessory pocket is protectively cushioned for the laptop computer.

These as well as other objects of the present invention will become apparent upon a review of the following drawings and detailed description in which:

BRIEF DESCRIPTION OF THE DRAWINGS

FIG. 3 is a perspective view of the wheeled catalog case shown in the open condition, with the accessory pocket being interiorly accessed and the laptop computer being manually removed therefrom.

FIG. 4 is a cross-sectional view as shown by the arrows 4—4 of FIG. 3 and looking in the direction of the arrows.

DETAILED DESCRIPTION

Figures 1, 2:
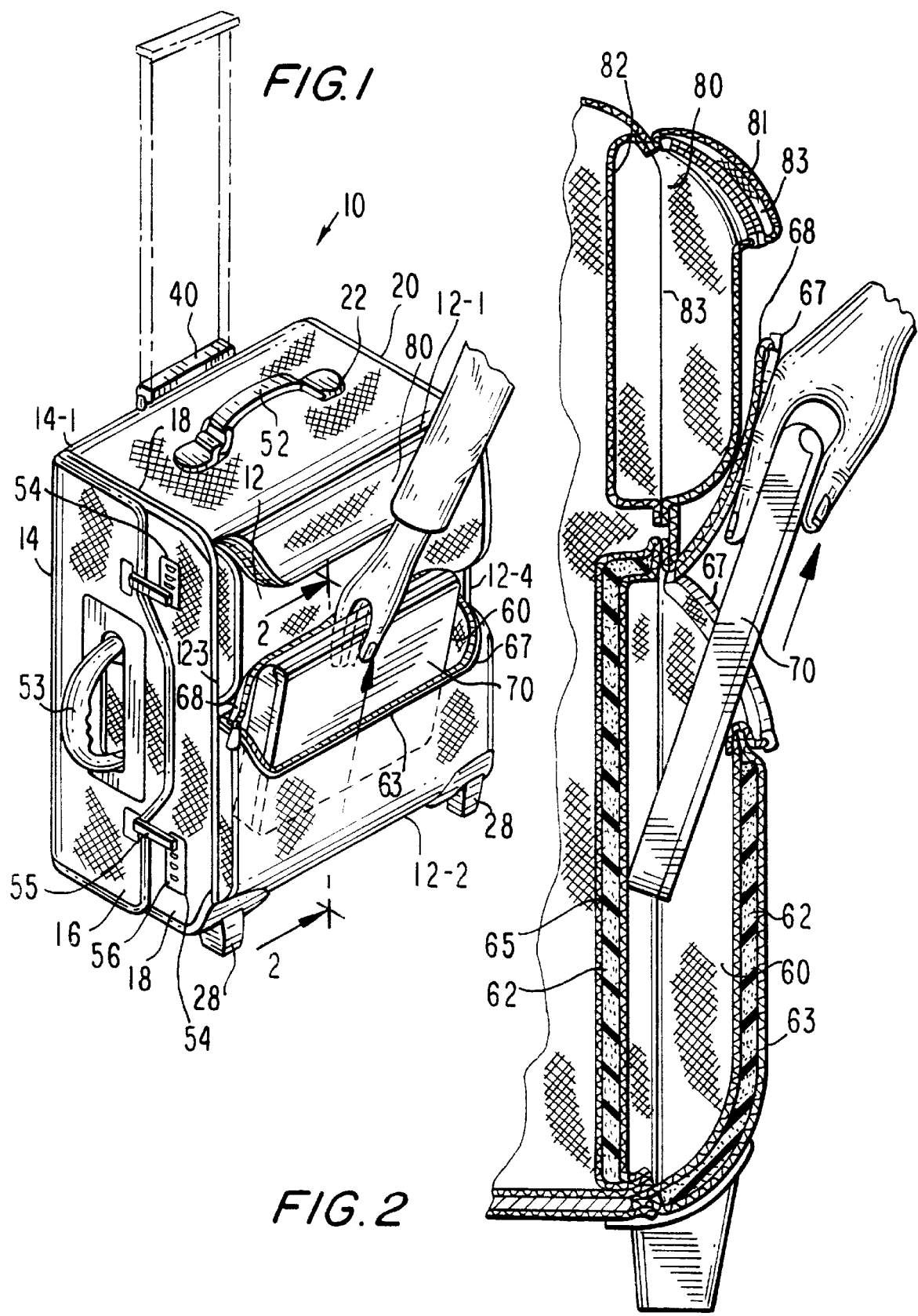
FIG. 1 is a perspective view showing the wheeled catalog case of the present invention, in the closed, transport mode, with the accessory pocket being exteriorly opened and the laptop computer manually grasped for removal therefrom.
FIG. 2 is a cross-sectional view along the arrows 2—2 as shown in FIG. 1 and looking in the direction of the arrows.

The wheeled catalog case generally shown as 10 includes opposed front wall 12 and back wall 14. The front wall includes a top edge 12-1, bottom edge 12-2, and first and second side edges 12-3, 12-4. The back wall similarly includes top edge 14-1, bottom edge 14-2, and first and second side edges 14-3, 14-4. A first side wall, including sections 16, 18, is connected between the side edges 12-3 and 14-3 of the front and back walls. A second side wall 20 is connected between the side edges 12-4 and 14-4 of the front and back walls. The top wall 22 is connected between the top edges of the front, 12, back, 14, and side walls 16, 18, 20. The bottom wall 24 is similarly connected between the bottom edges of the front, back, and side walls. Thus the front, back, side, top, and bottom walls collectively define an article receiving enclosure as best shown in the open condition of FIG. 3.

Wheels, 26, of the type typically used in various articles of luggage are shown located at the opposed side edges of the bottom wall 24. It should naturally be understood that additional wheels could be provided. Wheels 26 are preferably partially recessed within the corners of the case and mounted on their respective axes by ball bearings (not shown) to facilitate ease and quietness of movement. The opposite corners of the bottom wall preferably include projecting feet 28 to provide for balanced support of the wheeled catalog case when it is in the upright condition shown in FIG. 1, but is not being moved by the user.

An elongate, extendible handle member 40 is provided along the back wall 14. Handle assembly 40 is preferably located within a narrow compartment in the interior of the case 10. Alternatively, as is well known in the art, the handle assembly 40 may be mounted to the exterior of the back wall 14. Handle assembly may be moved to the storage retracted position, as shown in FIGS. 3 and 4, or extended outwardly, as shown in the dot-dash lines of FIG. 1 when it is desired to transport the case 10 along a ground surface. When the handle is extended outwardly the case is tipped backward, in a general counter clockwise condition, as shown in FIG. 1, such that the case will be transported along the wheels 26, with the feet 28 being lifted upward.

The case also includes handles 52 and 53 for manual carrying thereof, in either of its two orientations. In order to appropriately secure the contents of the case, a pair of lock mechanisms 54–55 are preferably provided in the well known conventional manner. The lock mechanism is shown as a combination type lock with three cylinders 56 in each of the lock pairs 54–55. It is however understood that alternative locks, such as a key actuated lock mechanism, may also be used.

In accordance with the present invention, an accessory pocket 60 is provided along the front wall 12 of the wheeled catalog case. Alternatively the accessory pocket could be provided along the back wall 14. The accessory pocket 60 will preferably be of a size which is adapted to contain a laptop computer, with one such computer typically shown as 70. Compartment 60 includes cushioning material 62, which may typically be foam, in both its exterior, wall 63, or interior wall, 65, to appropriately protect the laptop computer 70 when it is inserted in pocket 60. The accessory pocket 60 may be either exteriorly or interiorly accessed. The exterior access is provided by a closure flap 68 having a U-shaped closure means in the form of a zipper 67. The internal access is provided by closure flap 72 in which the closure means therefor is shown as cooperating hook and eye Velcro pressure fasteners 73, 75.

Although external lap 68 is shown in conjunction with a zipper closure, and the internal flap 72, in conjunction with a hook and eye Velcro pressure type fastener, this is for illustrative purposes only. Both of these closures may be zippers or a pressure fastener, as well as other alternative, well known closures, such as snaps or a spring loaded clasp. Further, if desired for additional protection, a lock (not shown) may be added in conjunction with the external pocket access provided by flap 68.

An important aspect of the present invention is the orthognal relationship between the exterior opening provided by pocket flap 68, and the interior opening, provided by pocket flap 72. By virtue of this orthognal relationship: (a) the exterior opening to the accessory pocket 60 will be in a generally horizontal condition when the case is in its wheeled orientation, as shown in FIGS. 1, and (2) also in a generally horizontal condition, when the case is rotated 90°, and opened, and the laptop computer 70 is being removed from the interior access to the accessory pocket 60, as shown in FIG. 3. This advantageously prevents inadvertent falling of the laptop computer out of its pocket 60 when the orientation of the bag is moved between its wheeled, and opened, conditions. That is, in both orientations, the accessible closure means to the accessory pocket 60 will be upwardly directed and horizontally oriented. Hence, this provides maximum safety against the laptop computer 70 accidentally falling out should the closure means be open.

An additional accessory exterior pocket 80, and interior pocket 82, may, if desired, also be included. Pockets 80 and 82 may be independent. Alternatively, if desired, wall 83 therebetween may be deleted to convert pockets 80, 82 into a single pocket, having both interior and exterior access. The exterior access to pocket 80 is illustratively shown as being similar to pocket 60, including flap 83 and zipper 81. Similarly, interior compartment 82 includes a flap 84 which may be closed by pressure hook and eye Velcro fasteners (not shown).

While the present invention has been discussed and described in detail with respect to a preferred embodiment thereof, various modifications may be made thereto without departing from the spirit and scope of the present invention as defined in the following claims.

What is claimed:

1. A wheeled article of luggage including:

a case having opposed front and back walls, each including a top edge, bottom edge and first and second side edges;

a first side wall connected between the first side edges of said first and back walls, and a second side wall connected between the second side edges of said front and back walls, each of said first and second side walls including top and bottom edges;

a top wall connected between the top edges of said front, back, first and second side walls, and a bottom wall connected between the bottom edges of said front, back, first and second side walls;

said front, back, first side wall, second side wall, top wall, and bottom wall defining an article receiving enclosure volume;

one of said side walls being openable to convert said case between closed and open conditions and provide access to said article receiving enclosure volume when said case is in its open condition;

wheels positioned along said bottom wall, and a handle extending upward from said top wall;

an accessory pocket within at least one of said front or back walls;

said one wall having opposed exterior and interior sides, with said exterior side forming an outermost wall of said case and said interior side being within said article receiving enclosure volume;

said accessory pocket extending exterior of said exterior side, and including an exterior closure means exteriorly accessible from said exterior side of said one wall when said case is in its closed condition and an interior closure means interiorly accessible from the interior side of said one wall only when said case is in its open condition, each of said closure means manually and independently movable between a closed condition to close its respective exterior or interior access to said accessory pocket, and an open condition to provide its respective exterior or interior access to said accessory pocket; and the open condition of said first exterior closure means being orthognally related to the open condition of said interior closure means.

2. A wheeled article of luggage according to claim 1, wherein at least one of said closure means is a zipper.

3. A wheeled article of luggage according to claim 1, wherein at least one of said closure means is a pressure fastener.

4. A wheeled article of luggage according to claim 1, wherein the exterior closure means of said accessory pocket in its open condition provides exterior access to said accessory pocket from the top of said one of said front or back walls; and said interior closure means of said accessory compartment in its open condition provides interior access to said accessory pocket from the side of said one of said front or back walls.

5. A wheeled article of luggage according to claim 4, wherein said handle includes an elongate extensible member for selective movement between a stored retracted position and an operable extended position;

said handle, when in said operable extended position guiding wheeled movement of the case in a first operative condition along a ground surface, with said exterior enclosure means being generally horizontally oriented;

said handle being manually movable to its stored retracted position during the opening of said one of said side walls to provide access to said article receiving enclosure; and the opening of said side wall also providing access to said interior closure means of said pocket, with said case being rotated 90° relative to said first operative condition to a second operative condition, with said interior closure means being generally horizontally oriented when said case is in its second operative condition.

6. A wheeled article of luggage according to claim 5, wherein said accessory pocket is adapted to receive a laptop computer, and said accessory pocket, includes exterior and interior walls, with cushioning material in both of said interior and exterior walls.

7. A wheeled article of luggage according to claim 5, wherein at least one of said closure means is a zipper.

8. A wheeled article of luggage according to claim 5, wherein at least one of said closure means is a pressure fastener.

9. A wheeled article of luggage according to claim 5, wherein said exterior closure means is a zipper, and said interior closure means is a pressure fastener.

10. A wheeled article of luggage according to claim 5, wherein said accessory pocket is within said front wall;

the exterior closure means of said accessory pocket in its open condition provides exterior access to said accessory pocket from the top and outside of said front wall; and said interior closure of said accessory pocket in its open condition provides interior access to said accessory pocket from the inside of said front wall.

11. A wheeled article of luggage according to claim 1, wherein said accessory pocket is within said front wall;

the exterior closure means of said accessory pocket in its open condition provides exterior access to said accessory pocket from the top of said front wall; and said interior closure of said accessory compartment in its open condition provides interior access to said accessory pocket from the side of said front wall.

12. A wheeled article of luggage according to claim 11, wherein said accessory pocket is adapted to receive a laptop computer, and said accessory pocket, includes exterior and interior walls, with cushioning material in both of said interior and exterior walls.

* * * * *